United States Patent
Yamaguchi et al.

(10) Patent No.: US 11,014,494 B2
(45) Date of Patent: May 25, 2021

(54) INFORMATION PROCESSING APPARATUS, INFORMATION PROCESSING METHOD, AND MOBILE BODY

(71) Applicant: SONY CORPORATION, Tokyo (JP)

(72) Inventors: Takamori Yamaguchi, Tokyo (JP); Koichi Hayakawa, Tokyo (JP); Masahiro Tamori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/638,853

(22) PCT Filed: Aug. 8, 2018

(86) PCT No.: PCT/JP2018/029733
§ 371 (c)(1),
(2) Date: Feb. 13, 2020

(87) PCT Pub. No.: WO2019/039281
PCT Pub. Date: Feb. 28, 2019

(65) Prior Publication Data
US 2020/0361369 A1  Nov. 19, 2020

(30) Foreign Application Priority Data
Aug. 22, 2017 (JP) .............................. JP2017-159407

(51) Int. Cl.
*G08G 1/00* (2006.01)
*B60Q 1/50* (2006.01)
(Continued)

(52) U.S. Cl.
CPC ............. *B60Q 1/50* (2013.01); *B60W 30/165* (2013.01); *G06K 9/00791* (2013.01); *G08G 1/22* (2013.01); *B60W 2756/10* (2020.02)

(58) Field of Classification Search
CPC ..... G08G 1/22; G05D 1/0293; B60W 30/165; B60W 2756/10; B60Q 1/50
See application file for complete search history.

(56) References Cited

U.S. PATENT DOCUMENTS

| 5,680,122 A | 10/1997 | Mio |
| 2002/0070849 A1* | 6/2002 | Teicher ................... B60Q 1/50 340/425.5 |

(Continued)

FOREIGN PATENT DOCUMENTS

| EP | 0762364 A2 | 3/1997 |
| JP | 08-163018 A | 6/1996 |

(Continued)

OTHER PUBLICATIONS

International Search Report and Written Opinion of PCT Application No. PCT/JP2018/029733, dated Nov. 13, 2018, 09 pages of ISRWO.

*Primary Examiner* — Andrew W Bee
(74) *Attorney, Agent, or Firm* — Chip Law Group

(57) ABSTRACT

The present technology relates to an information processing apparatus, an information processing method, a program, and a mobile body that make it easy to acquire information regarding a convoy of mobile bodies such as vehicles. The information processing apparatus is disposed in a first mobile body, and includes a convoy information detection section, a convoy information generation section, and an output control section. The convoy information detection section detects, based on a first optical signal outputted from a second mobile body preceding the first mobile body, convoy information regarding a convoy of mobile bodies including up to the second mobile body. The convoy information generation section updates the convoy information by adding information regarding the first mobile body to the convoy information. The output control section controls an (Continued)

output section in such a manner as to output a second optical signal to rearward of the first mobile body in accordance with the updated convoy information. The present technology is applicable, for example, to a vehicle designed for autonomous driving.

18 Claims, 7 Drawing Sheets

(51) Int. Cl.
*B60W 30/165* (2020.01)
*G06K 9/00* (2006.01)

(56) References Cited

U.S. PATENT DOCUMENTS

| | | | | |
|---|---|---|---|---|
| 2014/0107867 | A1* | 4/2014 | Yamashiro | G05D 1/0293 |
| | | | | 701/2 |
| 2014/0316671 | A1* | 10/2014 | Okamoto | G08G 1/22 |
| | | | | 701/96 |
| 2016/0019782 | A1* | 1/2016 | Alam | B60W 30/18163 |
| | | | | 340/905 |
| 2017/0038777 | A1* | 2/2017 | Harvey | G05D 1/0027 |
| 2019/0355259 | A1* | 11/2019 | Kruppa | H04B 10/1149 |

FOREIGN PATENT DOCUMENTS

| | | |
|---|---|---|
| JP | 09-081899 A | 3/1997 |
| JP | 2008-003675 A | 1/2008 |
| JP | 2013-196040 A | 9/2013 |
| JP | 2014-153950 A | 8/2014 |

\* cited by examiner

FIG. 4

| TYPE OF INFORMATION | DESCRIPTION OF INFORMATION |
|---|---|
| PLANNED ROUTE INFORMATION | CONVOY DESTINATION |
| | CONVOY TRANSIT POINT |
| SCHEDULED ARRIVAL TIME INFORMATION | SCHEDULED DESTINATION ARRIVAL TIME INFORMATION |
| | SCHEDULED TRANSIT POINT ARRIVAL TIME INFORMATION |
| CONVOY LENGTH INFORMATION | OVERALL CONVOY LENGTH |
| | OVERALL LENGTH OF EACH VEHICLE |
| | VEHICLE-TO-VEHICLE DISTANCE BETWEEN EACH VEHICLE |
| LIST OF CONVOY VEHICLES | VEHICLE SIZE |
| | VEHICLE TYPE |
| | VEHICLE MODEL NAME |
| | VEHICLE DYNAMIC PERFORMANCE |

FIG. 5

| No. | TRANSIT POINT/DESTINATION | SCHEDULED ARRIVAL TIME |
|---|---|---|
| 1 | TRANSIT POINT A | 10:00 |
| 2 | TRANSIT POINT B | 11:10 |
| 3 | TRANSIT POINT C | 12:30 |
| ⋮ | ⋮ | ⋮ |
| M | DESTINATION X | 15:00 |

INFORMATION PROCESSING APPARATUS, INFORMATION PROCESSING METHOD, AND MOBILE BODY

CROSS REFERENCE TO RELATED APPLICATIONS

This application is a U.S. National Phase of International Patent Application No. PCT/JP2018/029733 filed on Aug. 8, 2018, which claims priority benefit of Japanese Patent Application No. JP 2017-159407 filed in the Japan Patent Office on Aug. 22, 2017. Each of the above-referenced applications is hereby incorporated herein by reference in its entirety.

TECHNICAL FIELD

The present technology relates to an information processing apparatus, an information processing method, a program, and a mobile body. Specifically, the present technology relates to an information processing apparatus, an information processing method, a program, and a mobile body that make it easy to acquire information regarding a convoy of mobile bodies.

BACKGROUND ART

A previously proposed technology obtains an identification number ID included in optical data received from a preceding vehicle, increments the obtained identification number ID by one, uses the incremented identification number ID as the identification number ID of a host vehicle, and transmits optical data including the identification number ID of the host vehicle to a succeeding vehicle (refer, for example, to PTL 1).

CITATION LIST

Patent Literature

[PTL 1]
Japanese Patent Laid-open No. Hei 9-81899

SUMMARY

Technical Problem

The invention described in PTL 1 enables each of a convoy of traveling vehicles to recognize the position in the convoy from the identification number ID. However, the invention described in PTL 1 is unable to acquire information regarding the convoy.

The present technology has been made in view of the above circumstances, and makes it easy to acquire information regarding a convoy of vehicles or other mobile bodies.

Solution to Problem

An information processing apparatus according to a first aspect of the present technology is disposed in a first mobile body, and includes a convoy information detection section, a convoy information generation section, and an output control section. The convoy information detection section detects, based on a first optical signal outputted from a second mobile body preceding the first mobile body, convoy information regarding a convoy of mobile bodies including up to the second mobile body. The convoy information generation section updates the convoy information by adding information regarding the first mobile body to the convoy information. The output control section controls an output section in such a manner as to output a second optical signal to rearward of the first mobile body in accordance with the updated convoy information.

An information processing method according to the first aspect of the present technology causes an information processing apparatus disposed in a first mobile body to detect, based on a first optical signal outputted from a second mobile body preceding the first mobile body, convoy information regarding a convoy of mobile bodies including up to the second mobile body, update the convoy information by adding information regarding the first mobile body to the convoy information, and control an output section in such a manner as to output a second optical signal to rearward of the first mobile body in accordance with the updated convoy information.

A program according to the first aspect of the present technology causes a computer disposed in a first mobile body to perform a process including a convoy information detection step, a convoy information generation step, and an output control step. The convoy information detection step detects, based on a first optical signal outputted from a second mobile body preceding the first mobile body, convoy information regarding a convoy of mobile bodies including up to the second mobile body. The convoy information generation step updates the convoy information by adding information regarding the first mobile body to the convoy information. The output control step controls an output section in such a manner as to output a second optical signal to rearward of the first mobile body in accordance with the updated convoy information.

A mobile body according to a second aspect of the present technology includes a reception section, a convoy information detection section, a convoy information generation section, an output section, and an output control section. The reception section receives a first optical signal outputted from a preceding other mobile body. The convoy information detection section detects, based on the first optical signal, convoy information regarding a convoy of mobile bodies including up to the other mobile body. The convoy information generation section updates the convoy information by adding information regarding the host mobile body to the convoy information. The output section outputs a second optical signal. The output control section controls the output section in such a manner as to output the second optical signal rearward in accordance with the updated convoy information.

The first aspect of the present technology detects, based on a first optical signal outputted from a second mobile body preceding a first mobile body, convoy information regarding a convoy of mobile bodies including up to the second mobile body, updates the convoy information by adding information regarding the first mobile body to the convoy information, and controls an output section in such a manner as to output a second optical signal to rearward of the first mobile body in accordance with the updated convoy information.

The second aspect of the present technology receives a first optical signal outputted from a preceding other mobile body, detects, based on the first optical signal, convoy information regarding a convoy of mobile bodies including up to the other mobile body, updates the convoy information by adding information regarding the host mobile body to the convoy information, and controls an output section in such a manner as to output a second optical signal rearward in accordance with the updated convoy information.

Advantageous Effect of Invention

The first or second aspect of the present technology makes it easy to acquire information regarding a convoy of vehicles or other mobile bodies.

It should be noted that the advantage described here is not restrictive. The present technology is able to provide any other advantages described in the present disclosure.

BRIEF DESCRIPTION OF DRAWINGS

FIG. 4 is a diagram illustrating an example of a configuration of convoy information.

FIG. 5 is a diagram illustrating an example of a configuration of scheduled arrival time information.

DESCRIPTION OF EMBODIMENT

An embodiment of the present technology will now be described. The description will be given in the following order.

Figure 1:
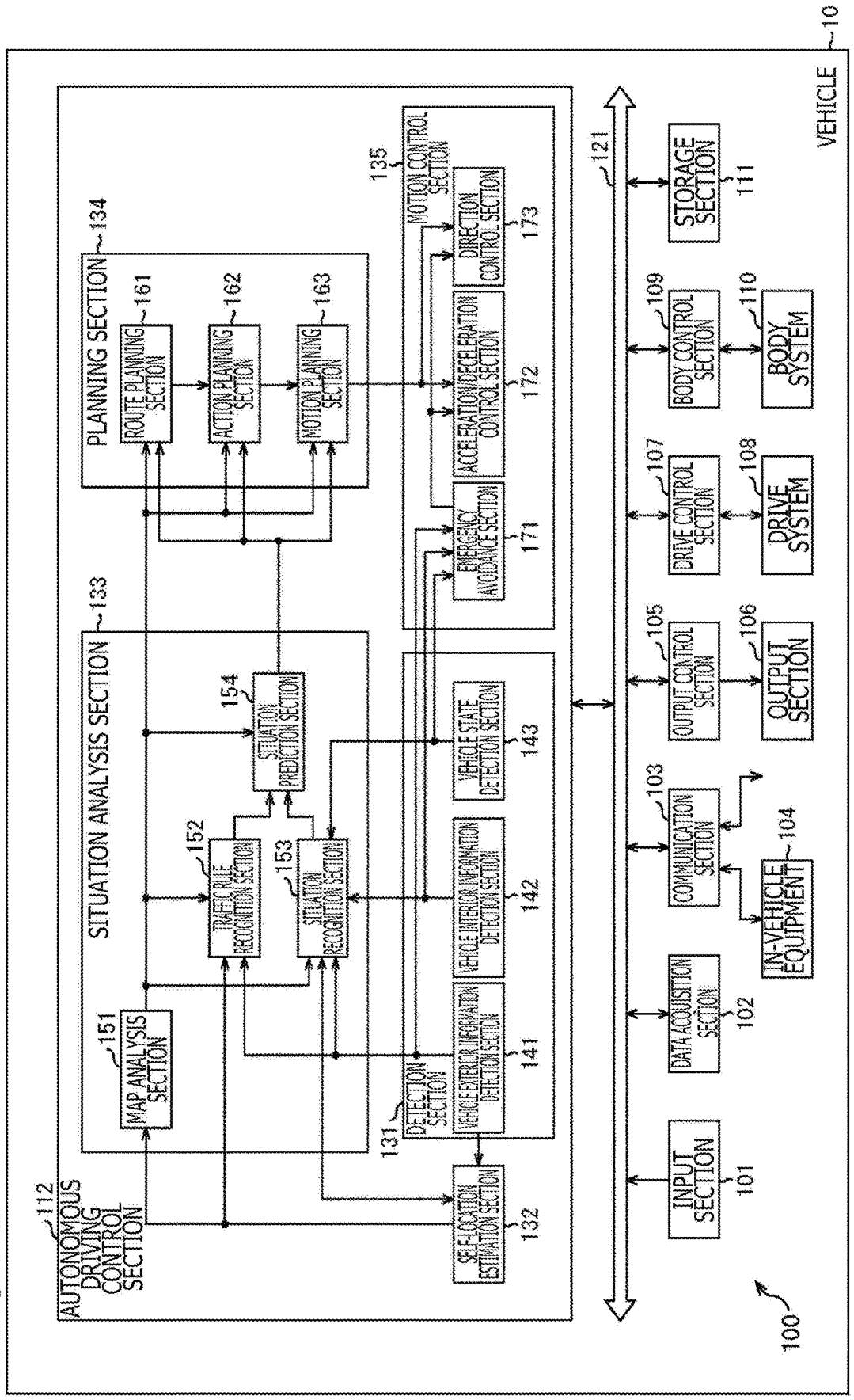
FIG. 1 is a block diagram illustrating an example of a schematic configuration of functions of a vehicle control system to which the present technology is applicable.

1. Example of Configuration of Vehicle Control System
2. Embodiment
3. Modifications
4. Other 1. Example of Configuration of Vehicle Control System FIG. 1 is a block diagram illustrating an example of a schematic configuration of functions of a vehicle control system 100 to which the present technology is applicable.

The vehicle control system 100 is disposed in a vehicle 10 and adapted to control the vehicle 10 in various ways. It should be noted that in a case the vehicle 10 is to be distinguished from another vehicle, the vehicle 10 is referred to as the host vehicle or the host mobile body.

The vehicle control system 100 includes an input section 101, a data acquisition section 102, a communication section 103, in-vehicle equipment 104, an output control section 105, an output section 106, a drive control section 107, a drive system 108, a body control section 109, a body system 110, a storage section 111, and an autonomous driving control section 112. The input section 101, the data acquisition section 102, the communication section 103, the output control section 105, the drive control section 107, the body control section 109, the storage section 111, and the autonomous driving control section 112 are interconnected through a communication network 121. The communication network 121 includes, for example, an in-vehicle communication network or bus compliant with a relevant standard such as CAN (Controller Area Network), LIN (Local Interconnect Network), LAN (Local Area Network), or FlexRay (registered trademark). It should be noted that various sections of the vehicle control system 100 may be directly interconnected instead of being interconnected through the communication network 121.

It should additionally be noted that the communication network 121 is not specifically mentioned in this document in a case various sections of the vehicle control system 100 establish communication through the communication network 121. In a case where, for example, the input section 101 and the autonomous driving control section 112 communicate with each other through the communication network 121, this document simply states that the input section 101 and the autonomous driving control section 112 communicate with each other.

The input section 101 includes apparatuses that are used by an onboard person in order to input, for example, various data and instructions. The input section 101 includes, for example, operating devices such as a touch panel, a button, a microphone, a switch, and a lever and operating devices capable of inputting various data and instructions by using, for example, voice or gesture instead of a manual operation. Furthermore, the input section 101 may be, for example, a remote control apparatus based on infrared rays or other radio waves or externally connected equipment operable corresponding to the operations of the vehicle control system 100, such as mobile equipment or wearable equipment. The input section 101 generates an input signal based, for example, on data and instructions inputted by the onboard person, and supplies the generated input signal to various sections of the vehicle control system 100.

The data acquisition section 102 includes, for example, various sensors for acquiring data to be subjected to processing in the vehicle control system 100, and supplies acquired data to various sections of the vehicle control system 100.

The data acquisition section 102 includes, for example, various sensors for detecting, for instance, the state of the vehicle 10. Specifically, the data acquisition section 102 includes, for example, a gyro sensor, an acceleration sensor, an inertial measurement unit (IMU), and a sensor for detecting, for instance, an accelerator pedal operation amount, a brake pedal operation amount, a steering wheel steering angle, an engine speed, a motor rotation speed, or a wheel rotation speed.

Furthermore, the data acquisition section 102 includes various sensors for detecting, for example, information regarding the exterior of the vehicle 10. Specifically, the data acquisition section 102 includes imaging apparatuses such as a ToF (Time Of Flight) camera, a stereo camera, a monocular camera, an infrared camera, and other cameras. Furthermore, the data acquisition section 102 includes an environmental sensor for detecting weather and other meteorological phenomena, and a peripheral information detection sensor for detecting objects around the vehicle 10. The environmental sensor includes, for example, a raindrop sensor, a fog sensor, a sunlight sensor, and a snow sensor. The peripheral information detection sensor includes, for example, an ultrasonic sensor, a radar, a LiDAR (Light Detection and Ranging, Laser Imaging Detection and Ranging), and sonar.

Furthermore, the data acquisition section 102 includes various sensors for detecting the current location of the vehicle 10. Specifically, the data acquisition section 102 includes, for example, a GNSS receiver for receiving a GNSS signal from a GNSS (Global Navigation Satellite System) satellite.

Moreover, the data acquisition section 102 includes, for example, various sensors for detecting information regarding the interior of the vehicle. Specifically, the data acquisition section 102 includes, for example, an imaging apparatus for capturing an image of a driver of the vehicle, a biosensor for detecting biological information regarding the driver, and a microphone for collecting sound in a vehicle compartment. The biosensor is disposed, for example, on the surface of a seat or on a steering wheel to detect the biological information regarding a passenger sitting on the seat or the driver holding the steering wheel.

The communication section 103 communicates with the in-vehicle equipment 104, various equipment outside the vehicle, a server, and a base station in order to transmit data supplied from various sections of the vehicle control system 100 and supply received data to various sections of the vehicle control system 100. It should be noted that a communication protocol supported by the communication section 103 is not particularly limited, and that the communication section 103 is able to support a plurality of different communication protocols.

For example, the communication section 103 establishes wireless communication with the in-vehicle equipment 104 by using a wireless LAN, Bluetooth (registered trademark), NFC (Near Field Communication), or WUSB (Wireless USB). Furthermore, for example, the communication section 103 establishes wired communication with the in-vehicle equipment 104 through a connection terminal (not depicted) (and, if necessary, a cable) by using USB (Universal Serial Bus), HDMI (registered trademark) (High-Definition Multimedia Interface), or MHL (Mobile High-definition Link).

Furthermore, the communication section 103 communicates, for example, with equipment (e.g., an application server or a control server) on an external network (e.g., the Internet, a cloud network, or a provider-specific network) through a base station or an access point. Furthermore, for example, the communication section 103 uses, for example, a P2P (Peer To Peer) technology to communicate with a terminal existing in the vicinity of the vehicle 10 (e.g., a terminal of a pedestrian or of a store or an MTC (Machine Type Communication) terminal). Moreover, the communication section 103 establishes V2X communication such as Vehicle to Vehicle communication, Vehicle to Infrastructure communication, Vehicle to Home communication, and Vehicle to Pedestrian communication. It should be noted that the communication section 103 includes a beacon reception section in order to receive radio waves or electromagnetic waves emitted, for example, from a wireless station installed on a road and acquire information regarding, for instance, the current location, traffic congestion, traffic restrictions, or required time.

The in-vehicle equipment 104 includes, for example, mobile equipment or wearable equipment possessed by the onboard person, information equipment carried into or mounted in the vehicle 10, and a navigation apparatus for searching for a route to a desired destination.

The output control section 105 controls the output of various information to the onboard person in the vehicle 10 or to the outside of the vehicle 10. For example, the output control section 105 controls the output of visual information and auditory information from the output section 106 by generating an output signal including at least one of visual information (e.g., image data) or auditory information (e.g., audio data) and supplying the generated output signal to the output section 106. Specifically, for example, the output control section 105 combines image data captured by different imaging apparatuses in the data acquisition section 102 to generate, for instance, an overhead image or a panoramic image, and supplies an output signal including the generated image to the output section 106. Furthermore, for example, the output control section 105 generates audio data including, for instance, a warning sound or warning message indicating the risk, for example, of collision, minor accident, or entry into a danger zone, and supplies an output signal including the generated audio data to the output section 106.

The output section 106 includes an apparatus capable of outputting visual information or auditory information to an onboard person in the vehicle 10 or to the outside of the vehicle 10. For example, the output section 106 includes a display apparatus, an instrument panel, an audio speaker, a headphone, a spectacle-type display or other wearable device worn by an onboard person, a projector, and a lamp. The display apparatus to be included in the output section 106 may be a head-up display, a transmission-type display, an apparatus having an AR (Augmented Reality) display function, or other apparatus displaying visual information in the field of view of the driver.

The drive control section 107 generates various control signals, and supplies the generated control signals to the drive system 108 in order to control the drive system 108. Furthermore, the drive control section 107 supplies the control signals to various sections other than the drive system 108 as needed in order to notify them of a controlled state of the drive system 108.

The drive system 108 includes various apparatuses related to a drivetrain of the vehicle 10. For example, the drive system 108 includes a driving force generation apparatus for generating a driving force for, for instance, an internal combustion engine or a drive motor, a driving force transmission mechanism for transmitting a driving force to wheels, a steering mechanism for adjusting a steering angle, a braking apparatus for generating a braking force, an ABS (Antilock Brake System), an ESC (Electronic Stability Control) apparatus, and an electric power steering apparatus.

The body control section 109 generates various control signals, and supplies the generated control signals to the body system 110 in order to control the body system 110. Furthermore, the body control section 109 supplies the control signals to various sections other than the body system 110 as needed in order to notify them of a controlled state of the body system 110.

The body system 110 includes various body-related apparatuses mounted in a vehicle body. For example, the body system 110 includes a keyless entry system, a smart-key system, a power window apparatus, a power seat, a steering wheel, an air conditioner, and various lamps (e.g., headlamps, backup lamps, brake lamps, direction indicator lamps, and fog lamps).

The storage section 111 includes, for example, a magnetic storage device such as a ROM (Read Only Memory), a RAM (Random Access Memory), an HDD (Hard Disc Drive), a semiconductor storage device, an optical storage device, and a magneto-optical storage device. The storage section 111 stores, for example, various programs and data that are used by various sections of the vehicle control system 100. For example, the storage section 111 stores map data such as a dynamic map or other high-accuracy three-dimensional map, a global map having lower accuracy and covering a wider area than the high-accuracy map, and a local map including information regarding an area around the vehicle 10.

The autonomous driving control section 112 provides control over autonomous driving such as automatic traveling or driving assistance. Specifically, the autonomous driving control section 112 provides coordinated control to implement ADAS (Advanced Driver Assistance System) functions for the vehicle 10 including, for example, collision avoidance or impact mitigation, follow-up traveling based on vehicle-to-vehicle distance, cruise control, collision warning, or lane departure warning. Furthermore, for example, the autonomous driving control section 112 provides coordinated control for autonomous driving in order to achieve automatic traveling without requiring driver intervention. The autonomous driving control section 112 includes a detection section 131, a self-location estimation section 132, a situation analysis section 133, a planning section 134, and a motion control section 135.

The detection section 131 detects various information necessary for controlling autonomous driving. The detection section 131 includes a vehicle exterior information detection section 141, a vehicle interior information detection section 142, and a vehicle state detection section 143.

The vehicle exterior information detection section 141 performs a detection process on exterior information regarding the vehicle 10 in accordance with data or signals from various sections of the vehicle control system 100. For example, the vehicle exterior information detection section 141 performs processes of detecting, recognizing, and tracking objects around the vehicle 10, and performs a process of detecting the distance to the objects. The objects to be detected include, for example, vehicles, persons, obstacles, structures, roads, traffic lights, traffic signs, and road signs. Furthermore, for example, the vehicle exterior information detection section 141 performs a process of detecting the environment around the vehicle 10. The environment to be detected includes, for example, weather, temperature, humidity, brightness, and road surface conditions. The vehicle exterior information detection section 141 supplies data indicative of the results of the detection processes, for example, to the self-location estimation section 132, to a map analysis section 151, traffic rule recognition section 152, and situation recognition section 153 of the situation analysis section 133, and to an emergency avoidance section 171 of the motion control section 135.

The vehicle interior information detection section 142 performs a process of detecting vehicle interior information in accordance with data or signals from various sections of the vehicle control system 100. For example, the vehicle interior information detection section 142 performs, for instance, processes of authenticating and recognizing the driver, a process of detecting a driver state, a process of detecting onboard persons, and a process of detecting an in-vehicle environment. The driver state to be detected includes, for example, physical conditions, consciousness, the degree of concentration, the degree of fatigue, and a gaze direction. The in-vehicle environment to be detected includes, for example, temperature, humidity, brightness, and odor. The vehicle interior information detection section 142 supplies data indicative of the results of the detection processes, for example, to the situation recognition section 153 of the situation analysis section 133 and to the emergency avoidance section 171 of the motion control section 135.

The vehicle state detection section 143 performs a process of detecting the state of the vehicle 10 in accordance with data or signals from various sections of the vehicle control system 100. The state of the vehicle 10 that is to be detected includes, for example, speed, acceleration, steering angle, the presence and description of abnormality, the state of a driving operation, the position and inclination of a power seat, the state of a door lock, and the state of other in-vehicle equipment. The vehicle state detection section 143 supplies data indicative of the result of the detection process, for example, to the situation recognition section 153 of the situation analysis section 133 and to the emergency avoidance section 171 of the motion control section 135.

The self-location estimation section 132 performs a process of estimating, for example, the location and posture of the vehicle 10 in accordance with data or signals from various sections of the vehicle control system 100, such as the vehicle exterior information detection section 141 and the situation recognition section 153 of the situation analysis section 133. Furthermore, the self-location estimation section 132 generates, as needed, a local map for estimating a self-location (hereinafter referred to as the self-location estimation map). The self-location estimation map is supposed to be a high-accuracy map obtained by using, for example, a SLAM (Simultaneous Localization and Mapping) technology. The self-location estimation section 132 supplies data indicative of the result of the estimation process, for example, to the map analysis section 151, traffic rule recognition section 152, and situation recognition section 153 of the situation analysis section 133. Furthermore, the self-location estimation section 132 stores the self-location estimation map in the storage section 111.

The situation analysis section 133 performs a process of analyzing the situation around the vehicle 10. The situation analysis section 133 includes the map analysis section 151, the traffic rule recognition section 152, the situation recognition section 153, and a situation prediction section 154.

The map analysis section 151 performs a process of analyzing various maps stored in the storage section 111 by using, as needed, data or signals from various sections of the vehicle control system 100, such as the self-location estimation section 132 and the vehicle exterior information detection section 141, and builds a map including information necessary for processing for autonomous driving. The map analysis section 151 supplies the built map, for example, to the traffic rule recognition section 152, the situation recognition section 153, and the situation prediction section 154, and to the route planning section 161, action planning section 162, and motion planning section 163 of the planning section 134.

The traffic rule recognition section 152 performs a process of recognizing traffic rules around the vehicle 10 in accordance with data or signals from various sections of the vehicle control system 100, such as the self-location estimation section 132, the vehicle exterior information detection section 141, and the map analysis section 151. This recognition process recognizes, for example, the location and state of a traffic light around the vehicle 10, traffic restrictions around the vehicle 10, and available lanes. The traffic rule recognition section 152 supplies data indicative of the result of the recognition process, for example, to the situation prediction section 154.

The situation recognition section 153 performs a process of recognizing a situation regarding the vehicle 10 in accordance with data or signals from various sections of the vehicle control system 100, such as the self-location estimation section 132, the vehicle exterior information detection section 141, the vehicle interior information detection section 142, the vehicle state detection section 143, and the map analysis section 151. For example, the situation recognition section 153 performs a process of recognizing, for example, the situation of the vehicle 10, the situation around the vehicle 10, and the situation of the driver of the vehicle 10. Furthermore, the situation recognition section 153 generates, as needed, a local map for recognizing the situation around the vehicle 10 (hereinafter referred to as the situation recognition map). The situation recognition map is supposed, for example, to be an Occupancy Grid Map.

The situation of the vehicle 10 that is to be recognized includes, for example, the location, posture, and motion (e.g., speed, acceleration, and movement direction) of the vehicle 10 and the presence and description of abnormality. The situation around the vehicle 10 that is to be recognized includes, for example, the type and location of a nearby stationary object, the type and location of a nearby moving object (e.g., speed, acceleration, and movement direction), the configuration of nearby roads and road surface conditions, and the weather, temperature, humidity, and brightness of a nearby area. The situation of the driver that is to be recognized includes, for example, physical conditions, consciousness, the degree of concentration, the degree of fatigue, a gaze direction, and a driving operation.

The situation recognition section 153 supplies data (including, as needed, the situation recognition map) indicative of the result of the recognition process, for example, to the self-location estimation section 132 and the situation prediction section 154. Furthermore, the situation recognition section 153 stores the situation recognition map in the storage section 111.

The situation prediction section 154 performs a process of predicting a situation regarding the vehicle 10 in accordance with data or signals from various sections of the vehicle control system 100, such as the map analysis section 151, the traffic rule recognition section 152, and the situation recognition section 153. For example, the situation prediction section 154 performs a process of predicting, for example, the situation of the vehicle 10, the situation around the vehicle 10, and the situation of the driver.

The situation of the vehicle 10 that is to be predicted includes, for example, the behavior of the vehicle 10, the occurrence of abnormality, and travelable distance. The situation around the vehicle 10 that is to be predicted includes, for example, the behavior of a moving object around the vehicle 10, changes in the state of a traffic light, and changes in weather and other environmental factors. The situation of the driver that is to be predicted includes, for example, the behavior and physical conditions of the driver.

The situation prediction section 154 supplies data indicative of the result of the prediction process and data received from the traffic rule recognition section 152 and the situation recognition section 153, for example, to the route planning section 161, action planning section 162, and motion planning section 163 of the planning section 134.

The route planning section 161 plans a route to a destination in accordance with data or signals from various sections of the vehicle control system 100, such as the map analysis section 151 and the situation prediction section 154. For example, the route planning section 161 sets a route from the current location to a designated destination in accordance with the global map. Furthermore, for example, the route planning section 161 changes a route as needed in accordance, for instance, with traffic congestion, accidents, traffic restrictions, construction work, and driver's physical conditions. The route planning section 161 supplies data indicative of a planned route, for example, to the action planning section 162.

Based on data or signals from various sections of the vehicle control system 100, such as the map analysis section 151 and the situation prediction section 154, the action planning section 162 plans an action of the vehicle 10 so as to travel safely within a planned time along a route planned by the route planning section 161. For example, the action planning section 162 makes a plan regarding, for instance, starting, stopping, traveling direction (e.g., forward movement, reversing, left turn, right turn, and direction change), driving lane, driving speed, and overtaking. The action planning section 162 supplies data indicative of a planned action of the vehicle 10, for example, to the motion planning section 163.

Based on data or signals from various sections of the vehicle control system 100, such as the map analysis section 151 and the situation prediction section 154, the motion planning section 163 plans a motion of the vehicle 10 so as to implement an action planned by the action planning section 162. For example, the motion planning section 163 makes a plan regarding, for instance, acceleration, deceleration, and a traveling track. The motion planning section 163 supplies data indicative of a planned motion of the vehicle 10, for example, to an acceleration/deceleration control section 172 and direction control section 173 of the motion control section 135.

The motion control section 135 controls the motion of the vehicle 10. The motion control section 135 includes the emergency avoidance section 171, the acceleration/deceleration control section 172, and the direction control section 173.

Based on the results of detection by the vehicle exterior information detection section 141, the vehicle interior information detection section 142, and the vehicle state detection section 143, the emergency avoidance section 171 performs a process of detecting an emergency such as a collision, a minor accident, entering a danger zone, a driver abnormality, and an abnormality of the vehicle 10. In a case where the occurrence of an emergency is detected, the emergency avoidance section 171 plans a motion of the vehicle 10 so as to avoid an emergency such as sudden braking or sudden turning. The emergency avoidance section 171 supplies data indicative of a planned motion of the vehicle 10, for example, to the acceleration/deceleration control section 172 and the direction control section 173.

The acceleration/deceleration control section 172 provides acceleration/deceleration control for implementing a motion of the vehicle 10 that is planned by the motion planning section 163 or the emergency avoidance section 171. For example, the acceleration/deceleration control section 172 computes a control target value for the driving force generation apparatus or the braking apparatus so as to achieve planned acceleration, deceleration, or sudden braking, and supplies a control command indicative of the computed control target value to the drive control section 107.

The direction control section 173 provides directional control for implementing a motion of the vehicle 10 that is planned by the motion planning section 163 or the emergency avoidance section 171. For example, the direction control section 173 computes a control target value for the steering mechanism so as to implement a traveling track or sudden turning planned by the motion planning section 163 or the emergency avoidance section 171, and supplies a control command indicative of the computed control target value to the drive control section 107.

2. Embodiment

An embodiment of the present technology will now be described with reference to FIGS. 2 to 7.

Note that the embodiment described below mainly relates to processing performed by the detection section 131, the situation analysis section 133, and the action planning section 162, which are included in the vehicle control system 100 depicted in FIG. 1.

<Example of Configuration of Convoy Processing System>

Figure 2:
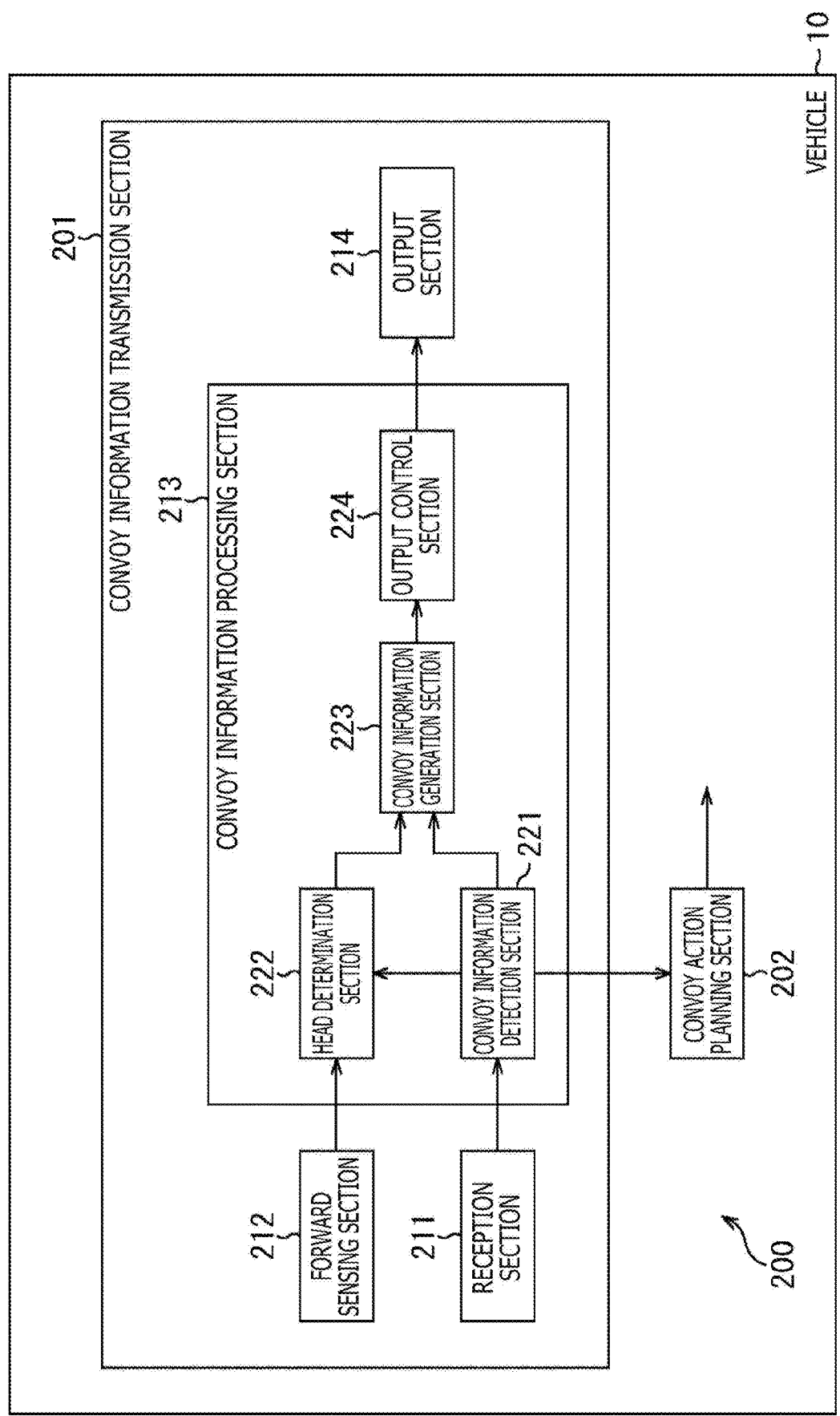
FIG. 2 is a block diagram illustrating an embodiment of a convoy processing system to which the present technology is applied.

FIG. 2 is a block diagram illustrating an embodiment of a convoy processing system 200 to which the present technology is applied.

The convoy processing system 200 performs processing related to a convoy of vehicles 10 in which the convoy processing system 200 is disposed. The convoy processing system 200 includes a convoy information transmission section 201 and a convoy action planning section 202.

The convoy information transmission section 201 transmits convoy information regarding a convoy between the vehicle 10 and a vehicle preceding the vehicle 10 and between the vehicle 10 and a vehicle succeeding the vehicle 10. The convoy information transmission section 201 includes a reception section 211, a forward sensing section 212, a convoy information processing section 213, and an output section 214.

The reception section 211 includes a device capable of receiving convoy information that is wirelessly transmitted from a preceding vehicle by an optical method. Specifically, for example, the reception section 211 includes a device capable of receiving convoy information that is wirelessly transmitted from a preceding vehicle by using an optical signal (hereinafter referred to as the optical signal).

It should be noted that the optical signal may be generated by any appropriate method.

For example, the optical signal generated by an optical modulation method may be used. The optical signal generated by the optical modulation method is a signal that is obtained by modulating, for example, the intensity or wavelength (color) of light by a predetermined method. In this case, the reception section 211 includes an imaging apparatus, an image sensor, a light-receiving element (e.g., photodiode), or other device capable of receiving an optical signal.

It should be noted that the optical signal generated by the optical modulation method may be a signal having an appropriate wavelength such as the wavelength of visible light or near-infrared light.

Furthermore, for example, the optical signal generated by a display method may be used. The optical signal generated by the display method is a visual signal generated by using displayed information (e.g., image), which uses, for example, text and drawings, to represent convoy information. For example, an image representing the convoy information by using text and drawings appears on a display in a preceding vehicle, whereas the vehicle 10 captures an image of that displayed image by using an imaging apparatus or an image sensor. The captured image is then subjected to image recognition in order to recognize the convoy information. In this case, the reception section 211 includes an imaging apparatus, an image sensor, or other device capable of capturing an image of displayed information.

It should be noted that the optical signal generated by the display method need not always be a signal visible to a human eye. Any signal recognizable by a device at the receiving end can act as the optical signal generated by the display method. Therefore, a signal having a wavelength, for example, of near-infrared light or light other than visible light may be used as the optical signal generated by the display method.

The reception section 211 receives an optical signal including convoy information (hereinafter referred to as the convoy information signal), converts the received optical signal (convoy information signal) to an electrical signal, and supplies the electrical signal to a convoy information detection section 221 in the convoy information processing section 213.

The forward sensing section 212 includes at least one of various imaging apparatuses or various sensors for detecting an object ahead of the vehicle 10. The forward sensing section 212 supplies sensor data indicative of the result of sensing forward of the vehicle 10 to a head determination section 222 in the convoy information processing section 213.

It should be noted that the same device may be used for convoy information signal reception by the reception section 211 and for forward object detection by the forward sensing section 212. For example, the reception section 211 and the forward sensing section 212 may share an imaging apparatus, an image sensor, or a light-receiving element.

The convoy information processing section 213, for example, generates or updates the convoy information, and controls the transmission of the convoy information to a succeeding vehicle. The convoy information processing section 213 includes the convoy information detection section 221, the head determination section 222, a convoy information generation section 223, and an output control section 224.

The convoy information detection section 221 detects convoy information included in the convoy information signal, and supplies the detected convoy information to the head determination section 222, the convoy information generation section 223, and the convoy action planning section 202.

Based on sensing data from the forward sensing section 212 and the result of convoy information detection by the convoy information detection section 221, the head determination section 222 determines whether or not the vehicle 10 is at the head of a convoy. The head determination section 222 supplies the result of determination to the convoy information generation section 223.

The convoy information generation section 223 generates or updates convoy information and supplies the convoy information to the output control section 224.

The output control section 224 controls the output of the convoy information from the output section 214.

The output section 214 includes a device capable of outputting an optical signal that is generated by the same method as in the reception section 211.

For example, the output section 214 includes a light-emitting element that emits light rearward of the vehicle 10 in a case where the convoy information is to be outputted by using the convoy information signal generated by the optical modulation method. This light-emitting element may be, for example, an LED or other dedicated light-emitting element or a tail lamp, a brake lamp, or other light-emitting element disposed on the rear of the vehicle 10.

Incidentally, it is preferable that, for example, the intensity, wavelength, and frequency of the convoy information signal be set so as not to dazzle or otherwise discomfort, for instance, a driver of a succeeding vehicle. Furthermore, in a case where a brake lamp is used, it is preferable that illumination caused by the convoy information signal be distinguishable from illumination caused by braking.

Furthermore, in a case where, for example, the convoy information is to be outputted by using the convoy information signal generated by the display method, the output section 214 includes a display device such as a display or an electronic message board. The display device is installed at a position easily visible from a succeeding vehicle.

Based on the convoy information, the convoy action planning section 202 plans an action of the vehicle 10 with respect to a convoy, such as joining, overtaking, or following up a convoy. The convoy action planning section 202 supplies data indicative of a prepared plan, for example, to the motion planning section 163 depicted in FIG. 1.

<Convoy-Related Process>

Figure 3:
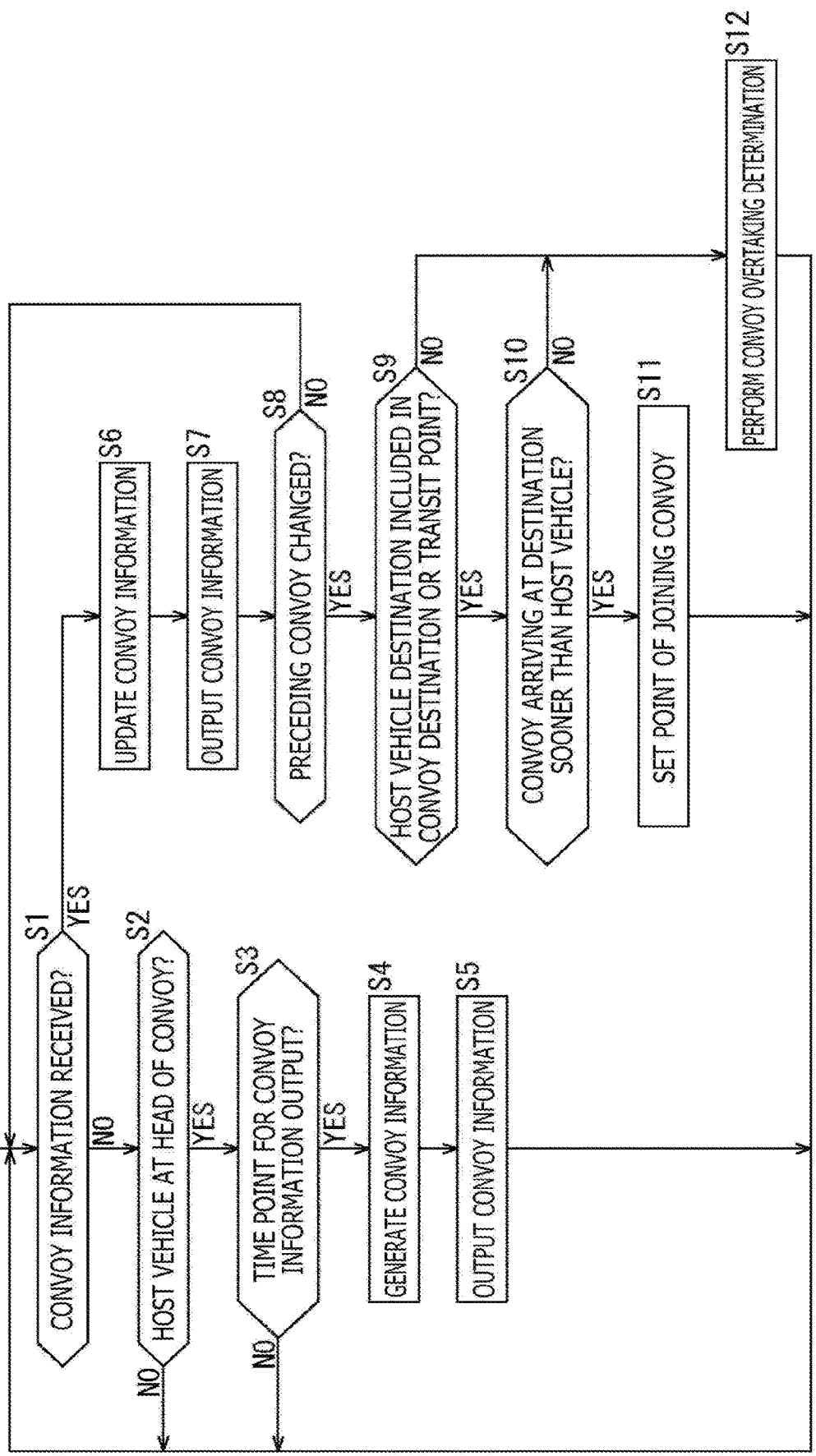
FIG. 3 is a flowchart illustrating a convoy-related process.

A convoy-related process performed by the convoy processing system 200 will now be described with reference to the flowchart of FIG. 3. It should be noted that this process starts when an operating procedure is performed to start up the vehicle 10 and begin to drive the vehicle 10, that is, when, for example, an ignition switch, a power switch, or a start switch of the vehicle 10 is turned on. Furthermore, this process ends when, for example, an operating procedure is performed to finish driving the vehicle 10, that is, when, for example, the ignition switch, the power switch, or the start switch of the vehicle 10 is turned off.

It should be noted that the vehicle 10 in which the convoy processing system 200 is disposed is referred to also as the host vehicle.

In step S1, the convoy information detection section 221 determines whether or not the convoy information is received. In a case where it is determined that the convoy information is not received, processing proceeds to step S2.

In step S2, the head determination section 222 determines whether or not the host vehicle is at the head of a convoy. Specifically, based on the sensing data from the forward sensing section 212, the head determination section 222 attempts to detect a preceding vehicle. In a case where a preceding vehicle is detected within a predetermined distance range, the head determination section 222 determines that the host vehicle is not at the head of the convoy, and processing returns to step S1.

Subsequently, steps S1 and S2 are repeatedly performed until it is determined in step S1 that the convoy information is received or until it is determined in step S2 that the host vehicle is at the head of the convoy.

Meanwhile, in a case where no preceding vehicle is detected in step S2 within the predetermined distance range, the head determination section 222 determines that the host vehicle is at the head of the convoy, and processing proceeds to step S3. In this instance, the head determination section 222 notifies the convoy information generation section 223 that the host vehicle is at the head of the convoy.

In step S3, the convoy information generation section 223 determines whether or not it is time for outputting the convoy information. In a case where the host vehicle is at the head of a convoy, the convoy processing system 200 outputs the convoy information, for example, at predetermined time intervals (e.g., at 10-second intervals). Then, in a case where a predetermined period of time has not elapsed since the last convoy information output, the convoy information generation section 223 determines that it is not time for outputting the convoy information, and processing returns to step S1.

Subsequently, steps S1 to S3 are repeatedly performed until it is determined in step S1 that the convoy information is received or until it is determined in step S3 that it is time for outputting the convoy information.

Meanwhile, in step S3, in a case where the predetermined period of time has elapsed since the last convoy information output or in a case where the host vehicle has just been located at the head of the convoy, the convoy information generation section 223 determines that it is time for outputting the convoy information, and processing proceeds to step S4.

In step S4, the convoy information generation section 223 generates the convoy information. Specifically, the convoy information generation section 223 generates the convoy information regarding a convoy that is headed by and formed only by the host vehicle, and supplies the generated convoy information to the output control section 224.

FIG. 4 illustrates an example of a configuration of the convoy information.

The convoy information includes, for example, planned route information, scheduled arrival time information, convoy length information, and a list of convoy vehicles.

The planned route information includes information regarding a destination of a vehicle at the head of a convoy and transit points for reaching the destination.

As depicted, for example, in FIG. 5, the scheduled arrival time information includes the time at which the vehicle at the head of the convoy is scheduled to arrive at the destination and the time at which the same vehicle is scheduled to arrive at each transit point.

The convoy length information includes, for example, overall convoy length, overall length of each vehicle in the convoy, and vehicle-to-vehicle distance between each vehicle. The overall convoy length is set, for example, to the length between the front end of the vehicle at the head of the convoy and the rear end of the host vehicle. Therefore, as regards the vehicle at the head of the convoy, the overall length of that vehicle is set as the overall convoy length.

The list of convoy vehicles is formed, for example, by arranging sets of information regarding individual vehicles in the convoy in descending order from the vehicle at the head of the convoy. The information regarding a vehicle includes, for example, the size, type, model name, and dynamic performance of the vehicle. The size of the vehicle includes, for example, the width direction and height direction dimensions of the vehicle or the cross-sectional area of the vehicle. The type of the vehicle includes, for example, a truck, a bus, an ordinary-sized vehicle, and a mini-sized vehicle. It should be noted that the overall length of each vehicle, which is included in the convoy length information, may be included in the list of convoy vehicles. It should also be noted that, as regards a vehicle at the head of a convoy, only the information regarding that vehicle is registered in the list of convoy vehicles.

It should additionally be noted that the convoy information is not limited to the above-described example. The number of types and definitions of the convoy information may be increased or decreased as needed.

In step S5, the output section 214 outputs the convoy information under the control of the output control section 224. Specifically, the output section 214 operates under the control of the output control section 224 so that a convoy information signal including the convoy information, which is generated by a predetermined method, is outputted rearward of the host vehicle.

Subsequently, processing returns to step S1 so as to perform steps S1 and beyond.

Meanwhile, in step S1, in a case where the convoy information signal is outputted from a vehicle preceding the host vehicle, the reception section 211 receives the outputted convoy information signal, converts the received convoy information signal to an electrical signal, and supplies the electrical signal to the convoy information detection section 221. Then, in a case where the convoy information detection section 221 detects the convoy information included in the convoy information signal, it is determined that the convoy information is received, and processing proceeds to step S6. It should be noted that the convoy information received from the preceding vehicle includes information regarding a convoy between a vehicle at the head of the convoy and the preceding vehicle.

In step S6, the convoy information generation section 223 updates the convoy information.

Specifically, the convoy information detection section 221 supplies the detected convoy information to the convoy information generation section 223.

The convoy information generation section 223 updates the convoy information by adding information regarding the host vehicle to the acquired convoy information.

For example, the convoy information generation section 223 adds the vehicle-to-vehicle distance to the preceding vehicle and the overall length of the host vehicle to the overall convoy length included in the convoy length information. Furthermore, the convoy information generation section 223 adds the overall length of the host vehicle and the vehicle-to-vehicle distance to the preceding vehicle to the convoy length information. Furthermore, for example, the convoy information generation section 223 adds information regarding the host vehicle to the list of convoy vehicles.

As a consequence, the information regarding the convoy between the vehicle at the head of the convoy and the preceding vehicle is updated to convoy information regarding a convoy between the vehicle at the head of the convoy and the host vehicle.

The convoy information generation section 223 supplies the updated convoy information to the output control section 224.

In step S7, the convoy information is outputted in the same manner as in step S5.

In step S8, the convoy action planning section 202 determines whether or not a forward convoy is changed.

Specifically, the convoy action planning section 202 compares the latest convoy information with previously acquired convoy information. In a case where, for example, there is no change in the destination and transit points of the convoy, the scheduled arrival time of the convoy at the destination, the scheduled arrival time of the convoy at each transit point, the vehicles in the convoy, and the order in which the vehicles are traveling, the convoy action planning section 202 determines that the forward convoy is not changed, and processing returns to step S1.

Subsequently, steps S1 and beyond are performed.

Meanwhile, in a case where, for example, there is a change in at least one of the destination or transit points of the convoy, the scheduled arrival time of the convoy at the destination, the scheduled arrival time of the convoy at each transit point, the vehicles in the convoy, and the order in which the vehicles are traveling, the convoy action planning section 202 determines in step S8 that the forward convoy is changed, and processing proceeds to step S9. Furthermore, for example, even in a case where the host vehicle at the head of a convoy catches up with a forward convoy and newly receives convoy information from a preceding vehicle, it is determined that the forward convoy is changed, and processing proceeds to step S9.

In step S9, the convoy action planning section 202 determines, based on the latest convoy information, whether or not the destination of the host vehicle is included in the destination or transit points of a convoy. In a case where it is determined that the destination of the host vehicle is included in the destination or transit points of the convoy, processing proceeds to step S10.

In step S10, the convoy action planning section 202 determines, based on the latest convoy information, whether or not the convoy arrives at the destination sooner than the host vehicle. In a case where the time at which the host vehicle is scheduled to arrive at the destination indicates that the convoy arrives at the destination sooner than the host vehicle, the convoy action planning section 202 determines that the convoy arrives at the destination sooner than the host vehicle, and processing proceeds to step S11.

In step S11, the convoy action planning section 202 sets a point of joining the convoy.

For example, based on the latest convoy information, the convoy action planning section 202 detects vehicles having a larger cross-sectional area than the host vehicle from vehicles in a convoy preceding the host vehicle, and sets the joining point in back of the detected vehicles. As a consequence, after joining the convoy, the host vehicle travels in back of a vehicle having a larger cross-sectional area than the host vehicle. This reduces the aerodynamic resistance of the host vehicle.

Furthermore, for example, based on the latest convoy information, the convoy action planning section 202 detects vehicles having a smaller cross-sectional area than the host vehicle from vehicles in a convoy preceding the host vehicle, and sets the joining point in front of one of the detected vehicles. As a consequence, after joining the convoy, the host vehicle travels in front of a vehicle having a larger cross-sectional area than the host vehicle. This reduces the aerodynamic resistance of a succeeding vehicle.

It should be noted that the above-described two schemes may be combined to set the joining point of the host vehicle.

Figure 6:
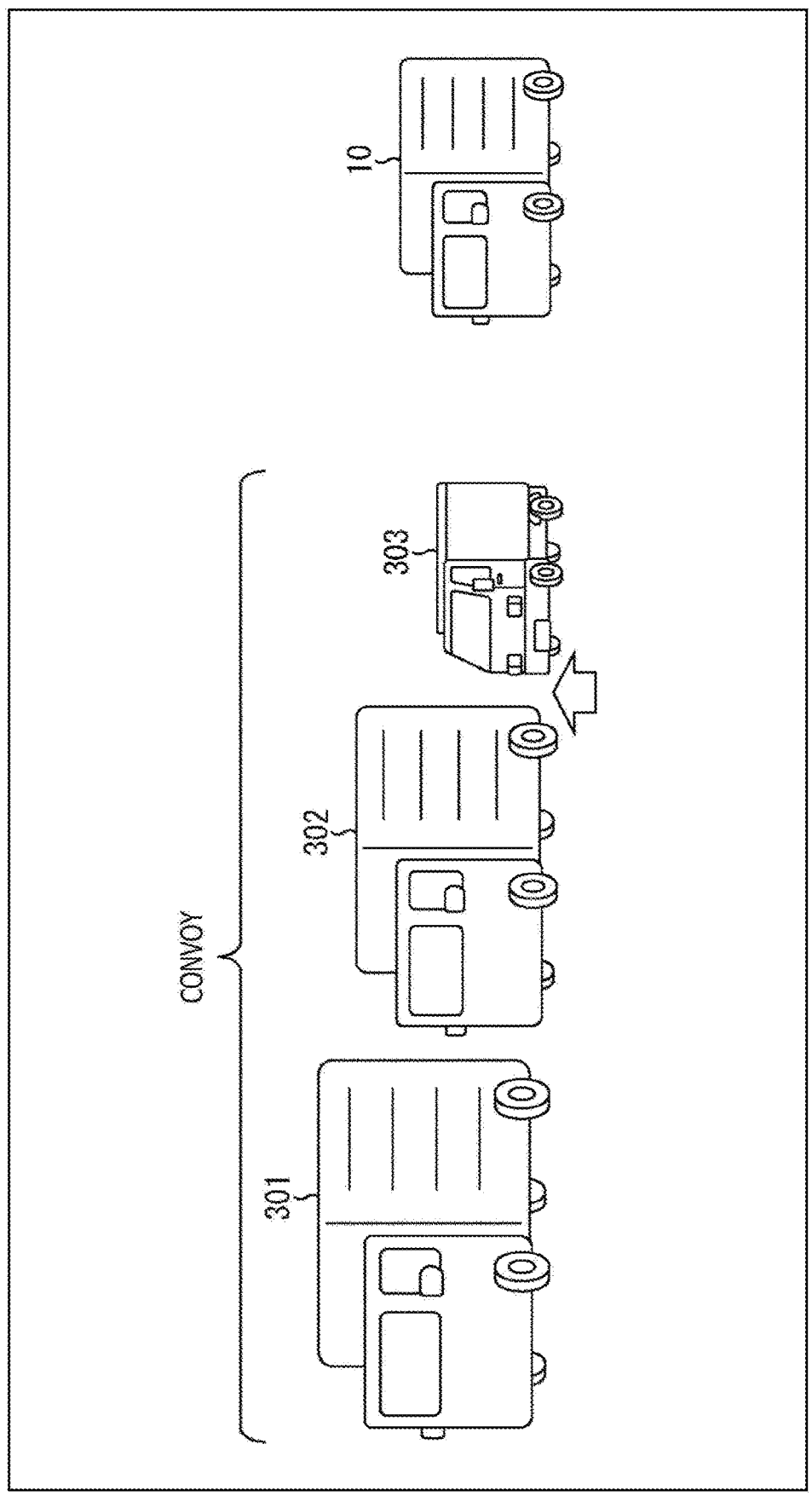
FIG. 6 is a diagram illustrating a method of setting a point of joining a convoy.

As an example, a case where the vehicle 10 (host vehicle) joins a convoy of vehicles 301 to 303 as depicted in FIG. 6 will now be described. It is assumed that, in descending order of cross-sectional area, the vehicles depicted in this example are the vehicle 301, the vehicle 302, the vehicle 10, and the vehicle 303.

In the above case, as indicated, for example, by the arrow in FIG. 6, the joining point is set in back of the vehicle 302 having a larger cross-sectional area than the vehicle 10 and in front of the vehicle 303 having a smaller cross-sectional area than the vehicle 10. This reduces the aerodynamic resistance of the vehicle 10 and vehicle 303 as compared to a case where they travel on an individual basis.

The convoy action planning section 202 generates action plan data that indicates a plan for joining a convoy and includes the joining point, and supplies the generated action plan data, for example, to the motion planning section 163 depicted in FIG. 1.

Subsequently, for example, the motion planning section 163 prepares a motion plan based on the action plan data, and then the motion control section 135 controls the motion of the host vehicle in accordance with the motion plan. This causes the host vehicle to join the convoy at the joining point set within the convoy.

Subsequently, processing returns to step S1 so as to perform steps S1 and beyond.

Meanwhile, in a case where it is determined in step S9 that the destination of the host vehicle is not included in the destination or transit points of the convoy or it is determined in step S10 that the convoy does not arrive at the destination sooner than the host vehicle, processing proceeds to step S12.

In step S12, the convoy action planning section 202 performs convoy overtaking determination. Specifically, based on the latest convoy information including, for example, the overall convoy length and the convoy's destination and transit points, the convoy action planning section 202 determines whether or not to overtake the convoy or follow up the convoy without overtaking it.

Figure 7:
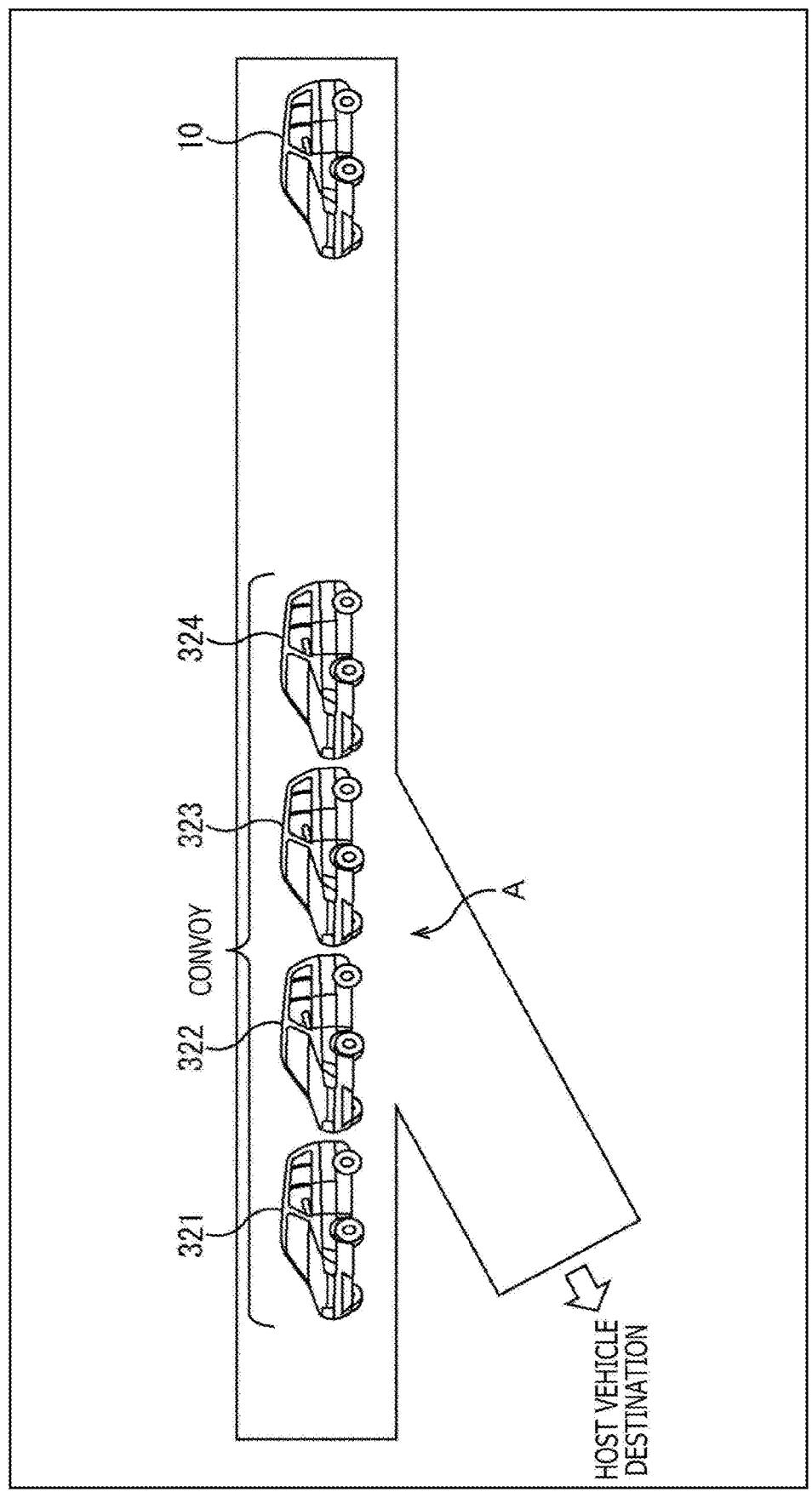
FIG. 7 is a diagram illustrating an example of a convoy overtaking determination process.

As an example, a case where a convoy of vehicles 321 to 324 exists in front of the vehicle 10 (host vehicle) as depicted in FIG. 7 will now be described. It is assumed that the destination of the convoy is different from the destination of the host vehicle, and that the directions of their destinations become different from each other at a fork A depicted in FIG. 7.

In the case of this example, the convoy is extended ahead of the fork A. Therefore, if the vehicle 10 overtakes the convoy, the vehicle 10 passes the fork A and is unable to travel to the destination. Consequently, the convoy action planning section 202 decides to follow up the convoy.

The convoy action planning section 202 generates action plan data indicative of whether or not to overtake or follow up the convoy, and supplies the generated action plan data, for example, to the motion planning section 163 depicted in FIG. 1.

Subsequently, for example, the motion planning section 163 prepares a motion plan based on the action plan data, and then the motion control section 135 controls the motion of the host vehicle in accordance with the motion plan. This causes the host vehicle to overtake the convoy or follow up the convoy without overtaking it.

Subsequently, processing returns to step S1 so as to perform steps S1 and beyond.

The above-described processing enables the host vehicle to easily acquire information regarding a convoy including up to a preceding vehicle and transmit information regarding the convoy including the host vehicle to a succeeding vehicle. Particularly, transmitting a vehicle information signal with optical equipment attached to the host vehicle, such as an imaging apparatus, a tail lamp, and a brake lamp, makes it possible to transmit the convoy information at a low cost without using, for example, any additional system or device.

Furthermore, the host vehicle is able to acquire the convoy information from only a preceding vehicle and transmit the convoy information to only a succeeding vehicle. Therefore, even if a plurality of convoys is on other lanes, the convoy information can be transmitted to only a vehicle that is substantially linearly located with respect to the host vehicle.

Furthermore, the host vehicle is able to acquire various information regarding a forward convoy and properly make a plan, for example, for joining, overtaking, or following up the convoy.

As a result, the host vehicle is able to arrive at its destination safely and promptly.

3. Modifications

Modifications of the embodiment of the technology according to the above-described present disclosure will now be described.

For example, information regarding a planned route of a vehicle other than a vehicle at the head of a convoy may be added to the planned route information included in the convoy information. In this case, information regarding the scheduled arrival time of a vehicle other a vehicle at the head of the convoy may be added to the scheduled arrival time information included in the convoy information.

Furthermore, the foregoing description relates to an example in which a vehicle at the head of a convoy outputs the convoy information at predetermined time intervals. Alternatively, however, the convoy information may be constantly outputted.

Furthermore, for example, a vehicle other than the vehicle at the head of a convoy may transmit the convoy information to a succeeding vehicle only in a case where the convoy information received from a preceding vehicle is changed. This reduces power consumption.

Furthermore, in a case where, for example, a particular vehicle is at a distance from a convoy, a vehicle behind the particular vehicle may transmit the convoy information to a succeeding vehicle. For example, in a case where vehicle A detects that vehicle B (preceding vehicle) located ahead of vehicle A is at a distance from a convoy, the convoy information may be updated by deleting information regarding vehicle B from the latest convoy information previously received from vehicle B (the convoy information regarding a convoy including up to vehicle B) and adding information regarding vehicle A (host vehicle) to the latest convoy information, and then the updated convoy information may be outputted rearward.

Moreover, the present technology is not only applicable to the above-illustrated vehicles, but also applicable to motorcycles, bicycles, personal mobility devices, and other mobile bodies capable of moving in a convoy. Furthermore, the mobile bodies to which the present technology is applicable include, for example, robots and other mobile bodies that are remotely operated (manipulated) without requiring a user to board them.

4. Other

<Example of Configuration of Computer>

The above-described series of processes can be performed by hardware or by software. In a case where the series of processes is to be performed by software, a program including the software is installed on a computer. Here, the computer may be a computer incorporated in dedicated hardware or a general-purpose personal computer or other computer capable of performing various functions as far as various programs are installed on the computer.

Figure 8:
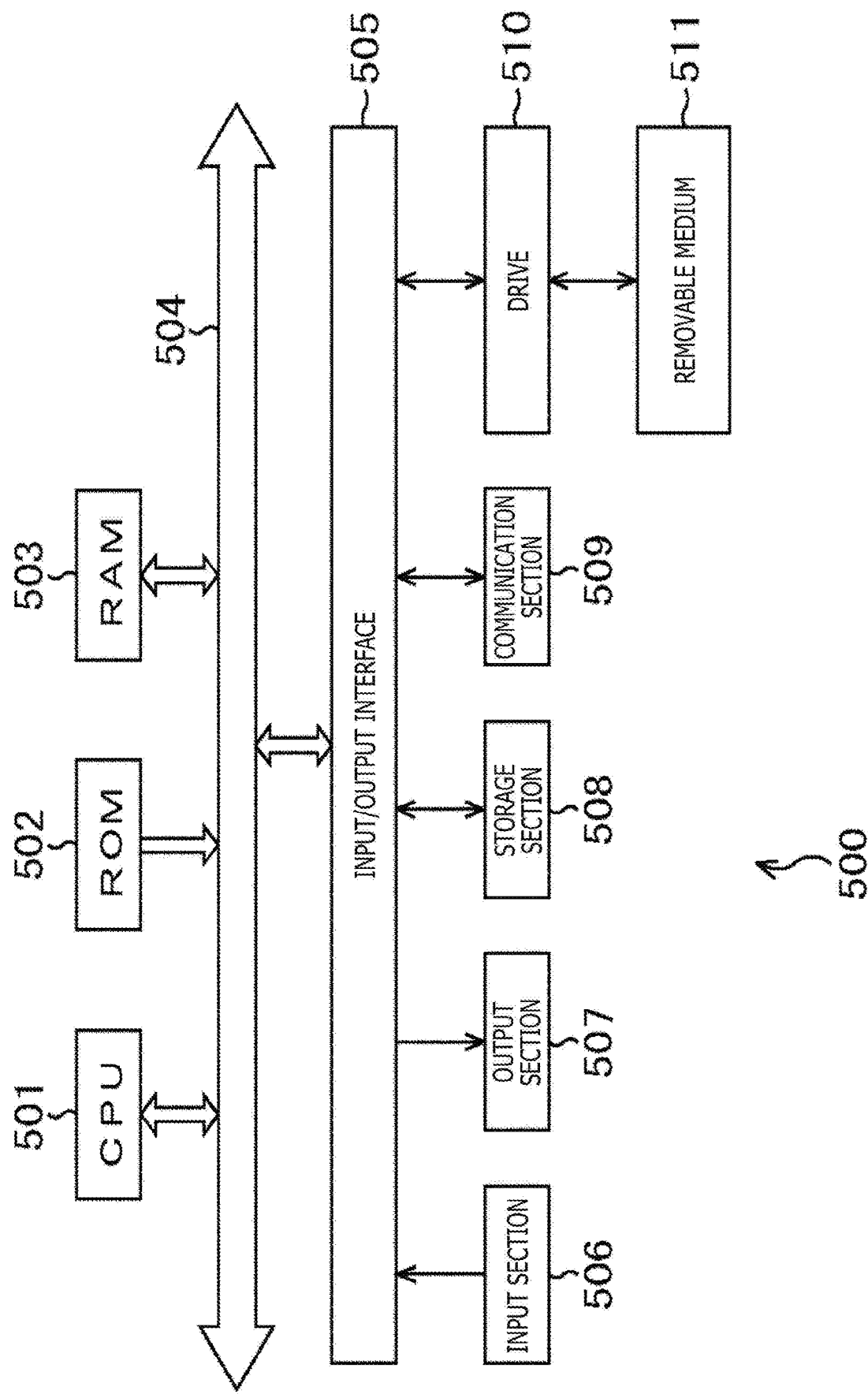
FIG. 8 is a diagram illustrating an example of a configuration of a computer.

FIG. 8 is a block diagram illustrating an example of a hardware configuration of a computer that performs the above-described series of processes by executing a program.

In the computer 500, a CPU (Central Processing Unit) 501, a ROM (Read Only Memory) 502, and a RAM (Random Access Memory) 503 are interconnected by a bus 504.

The bus 504 is further connected to an input/output interface 505. The input/output interface 505 is connected to an input section 506, an output section 507, a recording section 508, a communication section 509, and a drive 510.

The input section 506 includes, for example, an input switch, a button, a microphone, and an imaging element. The output section 507 includes, for example, a display and a speaker. The recording section 508 includes, for example, a hard disk and a nonvolatile memory. The communication section 509 includes, for example, a network interface. The drive 510 drives a removable recording medium 511 such as a magnetic disk, an optical disk, a magneto-optical disk, or a semiconductor memory.

In the computer 500 configured as described above, the CPU 501 performs the above-described series of processes, for example, by loading a program recorded in the recording section 508 into the RAM 503 through the input/output interface 505 and the bus 504, and executing the loaded program.

The program to be executed by the computer 500 (CPU 501) may be recorded and supplied on the removable recording medium 511, which is formed as a package medium. Furthermore, the program may be supplied through a wired or wireless transmission medium such as a local area network, the Internet, or a digital satellite broadcasting system.

The computer 500 is configured such that the program can be installed in the recording section 508 through the input/output interface 505 when the removable recording medium 511 on which the program is recorded is inserted into the drive 510. Furthermore, the program can be received by the communication section 509 through a wired or wireless transmission medium and installed in the recording section 508. Furthermore, the program can be preinstalled in the ROM 502 or the recording section 508.

It should be noted that the program to be executed by the computer may perform processing in a chronological order described in this document or perform processing in a parallel manner or at a necessary time point in response to a program call.

Furthermore, the term "system," which is used in this document, refers to an aggregate of a plurality of component elements (e.g., apparatuses and modules (parts)), and is applicable no matter whether or not all the component elements are within the same housing. Therefore, the term "system" may refer not only to a plurality of apparatuses accommodated in separate housings and connected through a network, but also to a single apparatus including a plurality of modules accommodated in a single housing.

Furthermore, the embodiment of the present technology is not limited to the above-described embodiment, and may be variously modified without departing from the spirit of the present technology.

For example, the present technology may be configured for cloud computing in which one function is shared by a plurality of apparatuses through a network in order to perform processing in a collaborative manner.

Furthermore, each step described with reference to the foregoing flowcharts may be not only performed by one apparatus but also performed in a shared manner by a plurality of apparatuses.

Furthermore, in a case where a plurality of processes is included in a single step, the plurality of processes included in such a single step may be not only performed by one apparatus but also performed in a shared manner by a plurality of apparatuses.

<Examples of Combined Configurations>

The present technology may adopt the following configurations.

(1)

An information processing apparatus that is disposed in a first mobile body, the information processing apparatus including:

a convoy information detection section that detects, based on a first optical signal outputted from a second mobile body preceding the first mobile body, convoy information regarding a convoy of mobile bodies including up to the second mobile body;

a convoy information generation section that updates the convoy information by adding information regarding the first mobile body to the convoy information; and an output control section that controls an output section in such a manner as to output a second optical signal to rearward of the first mobile body in accordance with the updated convoy information.

(2)

The information processing apparatus according to claim 1, in which the convoy information includes at least one of planned route information regarding the convoy, scheduled arrival time information regarding a destination or transit points of the convoy, information regarding the length of the convoy, or information regarding each of the mobile bodies in the convoy.

(3)

The information processing apparatus according to (2), in which the information regarding the mobile bodies includes the size of each of the mobile bodies.

(4)

The information processing apparatus according to any one of (1) to (3), in which in a case where the first mobile body is at the head of a convoy, the convoy information generation section generates convoy information regarding a convoy including the first mobile body only, while the output control section controls the output section in such a manner as to output the second optical signal rearward of the first mobile body in accordance with the generated convoy information.

(5)

The information processing apparatus according to any one of (1) to (4), in which in a case where the second mobile body is at a distance from the convoy, the convoy information generation section updates the convoy information by deleting information regarding the second mobile body from the convoy information regarding a convoy including up to the second mobile body and adding information regarding the first mobile body to the convoy information, while the output control section controls the output section in such a manner as to output the second optical signal to rearward of the first mobile body in accordance with the updated convoy information.

(6)

The information processing apparatus according to any one of (1) to (5), further including:

a convoy action planning section that plans an action of the first mobile body with respect to the convoy in accordance with the convoy information.

(7)

The information processing apparatus according to (6), in which the convoy action planning section plans an action of the first mobile body with respect to the convoy in accordance with the convoy information, the action being related to at least one of joining, overtaking, or following up.

(8)

The information processing apparatus according to (7), in which the convoy information includes the size of each of the mobile bodies in the convoy, and the convoy action planning section sets a point of joining the convoy in accordance with the size of each of the mobile bodies.

(9)

The information processing apparatus according to (7) or (8), in which the convoy information includes the length of the convoy, and the convoy action planning section makes a plan for overtaking the convoy in accordance with the length of the convoy.

(10)

The information processing apparatus according to any one of (1) to (9), in which the first optical signal and the second optical signal are obtained by modulating the intensity or wavelength of light.

(11)

The information processing apparatus according to (10), in which the first mobile body and the second mobile body each act as a vehicle, and the output control section controls the output of the second optical signal by controlling a tail or brake lamp of the first mobile body.

(12)

The information processing apparatus according to any one of (1) to (11), in which the first optical signal is received by an imaging apparatus adapted to capture an image of an area forward of the first mobile body.

(13)

An information processing method that is performed by an information processing apparatus disposed in a first mobile body, the information processing method including the steps of:

detecting, based on a first optical signal outputted from a second mobile body preceding the first mobile body, convoy information regarding a convoy of mobile bodies including up to the second mobile body;

updating the convoy information by adding information regarding the first mobile body to the convoy information; and controlling an output section in such a manner as to output a second optical signal to rearward of the first mobile body in accordance with the updated convoy information (14)

A program for causing a computer disposed in a first mobile body to perform a process including:

a convoy information detection step of detecting, based on a first optical signal outputted from a second mobile body preceding the first mobile body, convoy information regarding a convoy of mobile bodies including up to the second mobile body;

a convoy information generation step of updating the convoy information by adding information regarding the first mobile body to the convoy information; and an output control step of controlling an output section in such a manner as to output a second optical signal to rearward of the first mobile body in accordance with the updated convoy information.

(15)

A mobile body including:

a reception section that receives a first optical signal outputted from a preceding other mobile body;

a convoy information detection section that detects, based on the first optical signal, convoy information regarding a convoy of mobile bodies including up to the other mobile body;

a convoy information generation section that updates the convoy information by adding information regarding the host mobile body to the convoy information;

an output section that outputs a second optical signal; and an output control section that controls the output section in such a manner as to output the second optical signal rearward in accordance with the updated convoy information.

(16)

The mobile body according to (15), in which the reception section includes an imaging apparatus for capturing an image of an area forward of the mobile body.

(17)

The mobile body according to (15) or (16), in which the output section includes a light-emitting element for emitting light to rearward of the mobile body.

(18)

The mobile body according to (17), in which the mobile body and the other mobile body each act as a vehicle, and the light-emitting element acts as a tail or brake lamp.

It should be noted that the advantages described in this document are merely illustrative and not restrictive. The present technology is not limited to such advantages and can provide additional advantages.

REFERENCE SIGNS LIST

10 Vehicle, 100 Vehicle control system, 112 Autonomous driving control section, 132 Self-location estimation section, 141 Vehicle exterior information detection section, 153 Situation recognition section, 162 Action planning section, 163 Motion planning section, 135 Motion control section, 200 Convoy processing system, 201 Convoy information transmission section, 202 Convoy action planning section, 211 Reception section, 213 Convoy information processing section, 214 Output control section, 221 Convoy information detection section, 223 Convoy information generation section, 224 Output control section

The invention claimed is:

1. An information processing apparatus in a first mobile body, the information processing apparatus comprising:
a convoy information detection section configured to detect, based on a first optical signal outputted from a second mobile body preceding the first mobile body, a first convoy information regarding at least two mobile bodies of a plurality of mobile bodies of a convoy up to the second mobile body;
a convoy information generation section configured to update the first convoy information based on addition of information regarding the first mobile body to the first convoy information, wherein the first convoy information includes a list of convoy vehicles; and
an output control section configured to control an output section to output a second optical signal to rearward of the first mobile body based on the updated first convoy information.

2. The information processing apparatus according to claim 1, wherein the first convoy information includes at least one of planned route information regarding the convoy, scheduled arrival time information regarding one of a destination or transit points of the convoy, information regarding a length of the convoy, or information regarding each mobile body of the plurality of mobile bodies in the convoy.

3. The information processing apparatus according to claim 2, wherein the information regarding the mobile bodies includes a size of each mobile body of the plurality of mobile bodies.

4. The information processing apparatus according to claim 1, wherein the convoy information generation section is further configured to generate a second convoy information regarding a convoy including the first mobile body only, based on a determination that the first mobile body is at the head of the convoy, and the output control section is further configured to control the output section to output the second optical signal to rearward of the first mobile body based on the generated second convoy information.

5. The information processing apparatus according to claim 1, wherein the convoy information generation section is further configured to update the first convoy information by deletion of information regarding the second mobile body from the first convoy information regarding the convoy including the at least two mobile bodies up to the second mobile body, and by addition of information regarding the first mobile body to the first convoy information based on a determination that the second mobile body is at a distance from the convoy, and the output control section configured to control the output section to output the second optical signal to rearward of the first mobile body based on the updated first convoy information.

6. The information processing apparatus according to claim 1, further comprising:

a convoy action planning section configured to plan an action of the first mobile body with respect to the convoy based on the first convoy information.

7. The information processing apparatus according to claim 6, wherein the action is associated with at least one of join the convoy, overtake the convoy, or follow up the convoy.

8. The information processing apparatus according to claim 7, wherein the first convoy information includes a size of each mobile body of the plurality of mobile bodies in the convoy, and the convoy action planning section is further configured to set a point to join of joining the convoy based on the size of each mobile body of the plurality of mobile bodies.

9. The information processing apparatus according to claim 7, wherein the first convoy information includes a length of the convoy, and the convoy action planning section is further configured to determine a plan to overtake the convoy based on the length of the convoy.

10. The information processing apparatus according to claim 1, wherein the first optical signal and the second optical signal are obtained based on modulation of an intensity or a wavelength of light.

11. The information processing apparatus according to claim 10, wherein each of the first mobile body and the second mobile body acts each act as a vehicle, and the output control section is further configured to control the output of the second optical signal based on control of at least one of a tail or a brake lamp of the first mobile body.

12. The information processing apparatus according to claim 1, wherein the first optical signal is received by an imaging apparatus adapted to capture an image of an area forward of the first mobile body.

13. An information processing method, comprising:

detecting, based on a first optical signal outputted from a second mobile body preceding a first mobile body, convoy information regarding at least two mobile bodies of a plurality of mobile bodies of a convoy up to the second mobile body;

updating the convoy information by adding information regarding the first mobile body to the convoy information, wherein the first convoy information includes a list of convoy vehicles; and controlling an output section to output a second optical signal to rearward of the first mobile body based on the updated convoy information.

14. A non-transitory computer-readable medium having stored thereon computer-executable instructions which, when executed by a processor, cause the processor to execute operations, the operations comprising:

detecting, based on a first optical signal outputted from a second mobile body preceding a first mobile body, convoy information regarding at least two mobile bodies of a plurality of mobile bodies of a convoy up to the second mobile body;

updating the convoy information by adding information regarding the first mobile body to the convoy information, wherein the first convoy information includes a list of convoy vehicles; and controlling an output section to output a second optical signal to rearward of the first mobile body based on the updated convoy information.

15. A host mobile body, comprising:

a reception section configured to receive a first optical signal outputted from a preceding mobile body;

a convoy information detection section configured to detect, based on the first optical signal, convoy information regarding at least two mobile bodies of a plurality of mobile bodies in a convoy up to the preceding mobile body;

a convoy information generation section configured to update the convoy information based on addition of information regarding the host mobile body to the convoy information wherein the first convoy information includes a list of convoy vehicles;

an output section configured to output a second optical signal; and an output control section configured to control the output section to output the second optical signal to rearward of the host mobile body based on the updated convoy information.

16. The host mobile body according to claim 15, wherein the reception section includes an imaging apparatus configured to capture an image of an area forward of the host mobile body.

17. The host mobile body according to claim 15, wherein the output section includes a light-emitting element for emitting light to the rearward of the host mobile body.

18. The host mobile body according to claim 17, wherein both the host mobile body and the preceding mobile body act as a vehicle, and the light-emitting element acts as a tail or a brake lamp.

* * * * *